United States Patent [19]

Auterman

[11] Patent Number: 5,260,708
[45] Date of Patent: Nov. 9, 1993

[54] THREE DIMENSIONAL INTERFEROMETRIC SYNTHETIC APERTURE RADAR TERRAIN MAPPING WITH UNAMBIGUOUS PHASE UNWRAPPING EMPLOYING SUBSET BANDWIDTH PROCESSING

[75] Inventor: James L. Auterman, Ann Arbor, Mich.

[73] Assignee: Environmental Research Institute of Michigan, Ann Arbor, Mich.

[21] Appl. No.: 867,341

[22] Filed: Apr. 13, 1992

[51] Int. Cl.⁵ .................................. G01S 13/90
[52] U.S. Cl. ........................ 342/25; 342/59; 342/191
[58] Field of Search ........................ 342/25, 59, 191

[56] References Cited

U.S. PATENT DOCUMENTS

| | | | |
|---|---|---|---|
| 4,321,601 | 3/1982 | Richman | 343/5 |
| 4,495,500 | 1/1985 | Vickers | 342/59 |
| 4,975,704 | 12/1990 | Gabriel et al. | 342/25 |
| 5,012,249 | 4/1991 | Chan | 342/25 |
| 5,053,772 | 10/1991 | Lamper et al. | 342/25 |
| 5,191,343 | 3/1993 | Danzer et al. | 342/59 X |

OTHER PUBLICATIONS

"Airborne Pulsed Doppler Radar", by Guy V. Morris Georgia Tech Research Institute, Artech House, Section 10.5-Range Resolving, pp. 195-200.

*Primary Examiner*—T. H. Tubbesing
*Attorney, Agent, or Firm*—Krass & Young

[57] ABSTRACT

Synthetic aperture radar data is used to produce a terrain map. Two synthetic radar antennas are placed on an aircraft, which moves in a set of substantially parallel flight paths. At least one antenna repeatedly transmits radar signals whose return echoes are received by both the antennas. The echo signals are processed conventionally to yield slant range and Doppler frequency data for plural resolution cells. The measured phase difference for each resolution cell provides an ambiguous measure of slant range difference to the two antennas needed to determine terrain elevation and correct ground range. As in the prior art, the radar transmissions employ an extended bandwidth of wavelengths. The received echo data is reprocessed using less than the entire bandwidth of the radar transmission to achieve additional center wavelengths. This produces a differing ambiguity interval and permits unambiguous determination of the slant range difference.

34 Claims, 7 Drawing Sheets

1

THREE DIMENSIONAL INTERFEROMETRIC SYNTHETIC APERTURE RADAR TERRAIN MAPPING WITH UNAMBIGUOUS PHASE UNWRAPPING EMPLOYING SUBSET BANDWIDTH PROCESSING

TECHNICAL FIELD OF THE INVENTION

The technical field of this invention is terrain mapping employing synthetic aperture radar.

BACKGROUND OF THE INVENTION

There is a need for inexpensive, quickly formed and accurate terrain elevation maps. It would be helpful if these terrain elevation maps could be constructed from radar sensor data taken from aircraft. The data could be obtained by flying over the area to be mapped while operating the radar sensor. The radar sensor data could then be employed together with the known or measured path of the aircraft to produce the needed terrain elevation map. Synthetic aperture radar would be useful in construction of such terrain elevation maps except for some limitations in the prior art.

In synthetic aperture radar the motion of the aircraft is employed to achieve greater angular resolution than obtainable by antennas that can be mounted on the aircraft. The motion of the aircraft permits formation of a synthetic antenna that is larger in size than the real antenna. This large synthetic antenna has an angular resolution corresponding to the angular resolution of an equally large physical antenna. The aircraft flies in a predetermined path and repeatedly transmits a radar signal. It is typical for this radar signal to be directed to the side of the flight path via a small antenna. This cross track view may be directly perpendicular to the flight path or at some angle less than perpendicular. The same antenna receives return echoes of the transmitted signal.

The return echo signals are processed in two dimensions. The time to receive an echo return from any particular piece of terrain corresponds to its slant range from the aircraft. This range is called slant range because it typically follows a downwardly slanting path from the aircraft to the ground. The echo returns also have differing Doppler frequencies. The motion of the aircraft imparts a Doppler frequency shift in the echo returns from the stationary ground. Areas directly ahead of the aircraft have a maximum closing Doppler frequency, those directly behind have a maximum opening Doppler frequency. Areas at varying angles between these extremes have intermediate Doppler frequencies. The combination of time of return and Doppler frequency permit production of a two dimensional feature map of resolution cells. Plural echo returns can be processed together with the known path and velocity of the aircraft to produce a terrain map.

There is a problem with this technique. This technique produces a position ambiguity. An echo signal with a particular time of return and Doppler frequency does not define a unique location. Regions of echo return times equal within the limits of measurement lie on a spherical shell centered at the antenna location. Regions of Doppler frequencies equal within the limits of measurement lie on a conical shell having its vertex at the antenna and its axis on the velocity vector of the aircraft. The intersection of these regions forms a vertically disposed circular annulus. Actual echo returns can only come from areas illuminated by the transmissions, so that the return areas are further limited to the solid angle cone of the antenna. Still this leaves an ambiguity in the location of the terrain forming the echo return. Terrain features having greater elevations are foreshortened because they have a reduced slant range compared with to regions of lower elevation.

Richman, U.S. Pat. No. 4,321,601, issued Mar. 23, 1982 and entitled "THREE DIMENSIONAL AZIMUTH-CORRECTING MAPPING RADAR" proposes a solution to this terrain elevation ambiguity problem. Richman employs two synthetic aperture radar antennas disposed a known distance apart on the aircraft. The antennas have the same look angles to cover the same terrain. Each antenna has its data processed in both slant range and Doppler frequency to identify and correlate echo returns from the same portions of terrain in the two antennas. The phase difference between the echo returns of the two antennas for the same resolution cell corresponds to the slant angle to the location producing that echo. Simple trigonometry permits computation of terrain elevation for a particular echo return from the slant angle, the known altitude of the aircraft and the measured slant range.

The technique of Richman measures the difference in slant range between the respective antennas and the target location by measuring the phase difference of the echo returns. The phase difference measurement introduces a $2\pi$ ambiguity. That is, the actual slant range difference could include one or more factors of $2\pi$ while yielding the same phase difference. This circular phase ambiguity produces an ambiguity in the terrain elevation calculated by this technique. A known technique called phase unwrapping can be used to reduce this ambiguity. The phase unwrapping technique requires a good signal to noise ratio and well behaved terrain yet still produces a bias ambiguity over the entire terrain mapped. There is a need in the art to provide a manner of reducing or eliminating the measurement ambiguity introduced in this interferometric determination of the terrain elevation.

SUMMARY OF THE INVENTION

The present application addresses the problem of unambiguous determination of the slant range difference in synthetic aperture radar terrain mapping. The technique employs two antennas placed a predetermined distance apart on a moving platform, such as an aircraft. These two antennas have the same field of view that is off the axis of motion of the aircraft. The aircraft moves in a set of substantially parallel flight paths while taking radar data. An altimeter provides altitude data which is used in conjunction with the radar information to produce a three dimensional terrain map.

The two antenna synthetic radar system is used generally in the manner taught in the Richman patent. During each flight the first antenna repeatedly transmits radar signals. Both the first and second antennas receive return echoes. These are processed conventionally to yield slant range and Doppler frequency data for plural resolution cells. The complex image data for corresponding resolution cells is employed to obtain the difference in phase between the two antennas. The complex image data for corresponding resolution cells is interfered to produce a product. The phase of the product is a measure of the difference in phase between the two antennas for that region. This phase difference data is a measure of the difference in slant range to the two antennas.

This invention is a manner for obtaining data at additional center wavelengths without requiring additional radar hardware or additional data recording capability. This technique proposes additional data processing following data acquisition and recording. This invention exploits the extended bandwidth of wavelengths of these radar transmissions. It is well known in the radar art that the degree of slant range resolution depends upon the transmission bandwidth. A larger transmission bandwidth permits finer slant range resolution. It is typical to achieve this transmission bandwidth using a linearly swept carrier frequency called an FM chirp transmission.

This invention reprocesses the same received data to achieve additional center wavelengths. A different center wavelength is achieved by reprocessing less than the entire bandwidth of the radar transmission. Processing the lower half of the original transmitted bandwidth, for example, produces a center wavelength for the newly reprocessed data offset by one quarter of the transmitted bandwidth. This reduced bandwidth signal is processed in the same manner as the actual transmitted signal in range and Doppler for the two receiving antennas. The corresponding range and Doppler cells of the two processed signals are interfered to determine a lower reduced bandwidth phase difference. Similar processing of the upper half of the original bandwidth yields an upper reduced bandwidth phase difference. These three phase differences, which have differing center wavelengths, provide differing ambiguity intervals. Thus the circular ambiguity in the primary phase difference may generally be unwrapped even for cases where the phase differences are not well behaved.

BRIEF DESCRIPTION OF THE DRAWINGS

These and other objects and aspects of the present invention will become clear from the following description of the invention, in which.

DETAILED DESCRIPTION OF THE PREFERRED EMBODIMENTS

Figure 1:
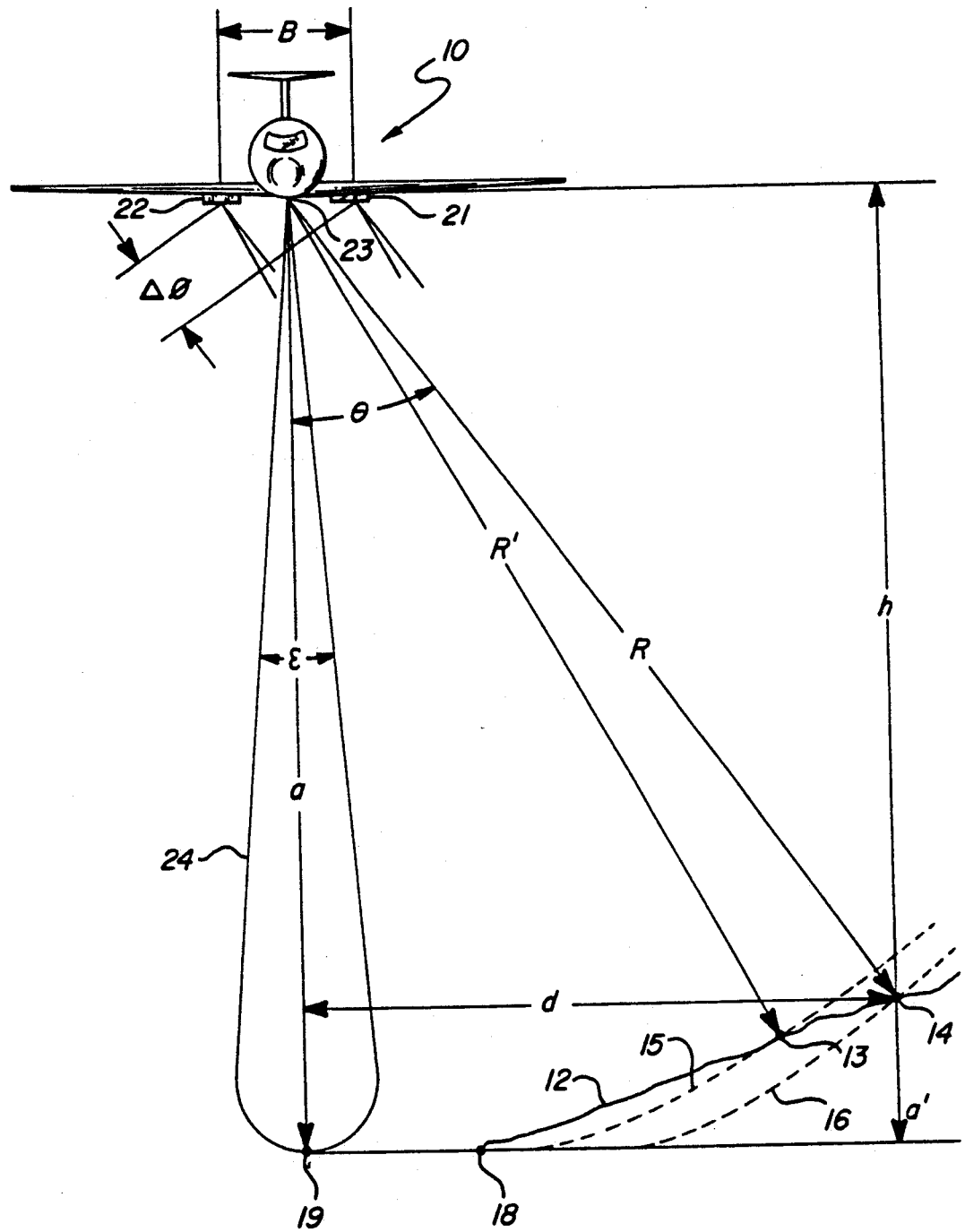
FIG. 1 illustrates the principles of operation of the synthetic aperture radar in accordance with a preferred embodiment of present invention.

FIG. 1 illustrates the operation of the three dimensional synthetic aperture radar terrain mapping technique of this invention. Aircraft 10 is illustrated as moving out of the plane of the illustration toward the viewer. Aircraft 10 includes two synthetic aperture radar antennas 21 and 22. The two antennas 21 and 22 are separated by a known distance B. These two antennas 21 and 22 each have the major lobe of their radiation response directed across the path of aircraft 10. In particular, antennas 21 and 22 have their response directed to substantially the same portion of terrain 12. Note that this response need not be directly perpendicular to the flight path of aircraft 10 but may be disposed at a forward-looking angle or a rearward-looking angle.

Aircraft 10 also includes a ranging altimeter 23. Ranging altimeter 23 directs a radiant beam 24 downward toward nadir point 19. This radiant beam 24 has a beam width angle $\epsilon$, whose magnitude will be further discussed below. Ranging altimeter 23 detects reflection of this radiant beam from terrain 12. Ranging altimeter 23 determines the distance of aircraft 10 above terrain 12 by detecting the time for this reflection to return from nadir point 19. In accordance with the preferred embodiment of this invention ranging altimeter 23 may be a radar altimeter or a laser ranging instrument.

In operation aircraft 10 flies by the terrain to be mapped. In one embodiment antenna 21 is active and periodically transmits a radar pulse, which is typically frequency modulated, having a center wavelength $\lambda$. Both antennas 21 and 22 receive the return echoes from these transmissions. The signals received at the two antennas 21 and 22 are separately processed in slant range and Doppler frequency according to the prior art. This yields a two dimensional image of terrain 12 including the slant range R and the along track coordinate corresponding to the Doppler frequency for each antenna 21 and 22. At the same time ranging altimeter 23 repeatedly detects the distance a from aircraft 10 to nadir point 19. These two dimensional complex images and the altimeter data are employed in construction of a three dimensional terrain map.

FIG. 1 illustrates the foreshortening of higher elevations in the prior art. Doppler frequency processing of the return response localizes points 13 and 14 of terrain 12 to the plane of the illustration. Thus points 13 and 14 can only be distinguished in slant range. Point 13 lies on arc 15 and has a slant range R'. Point 14 lies on arc 16 and has a slant range R. Point 14, which has a higher elevation than point 13, appears closer to the flight path of aircraft 10 than would a point at the same elevation as point 13. This is because the slant range R is less because of the elevation of point 14. Because of the ambiguities inherent in synthetic aperture radar processing, points along arc 16 cannot be distinguished. This arc ambiguity also leads to distortion in determination of the ground range d to a particular point in terrain 12.

Figure 2:
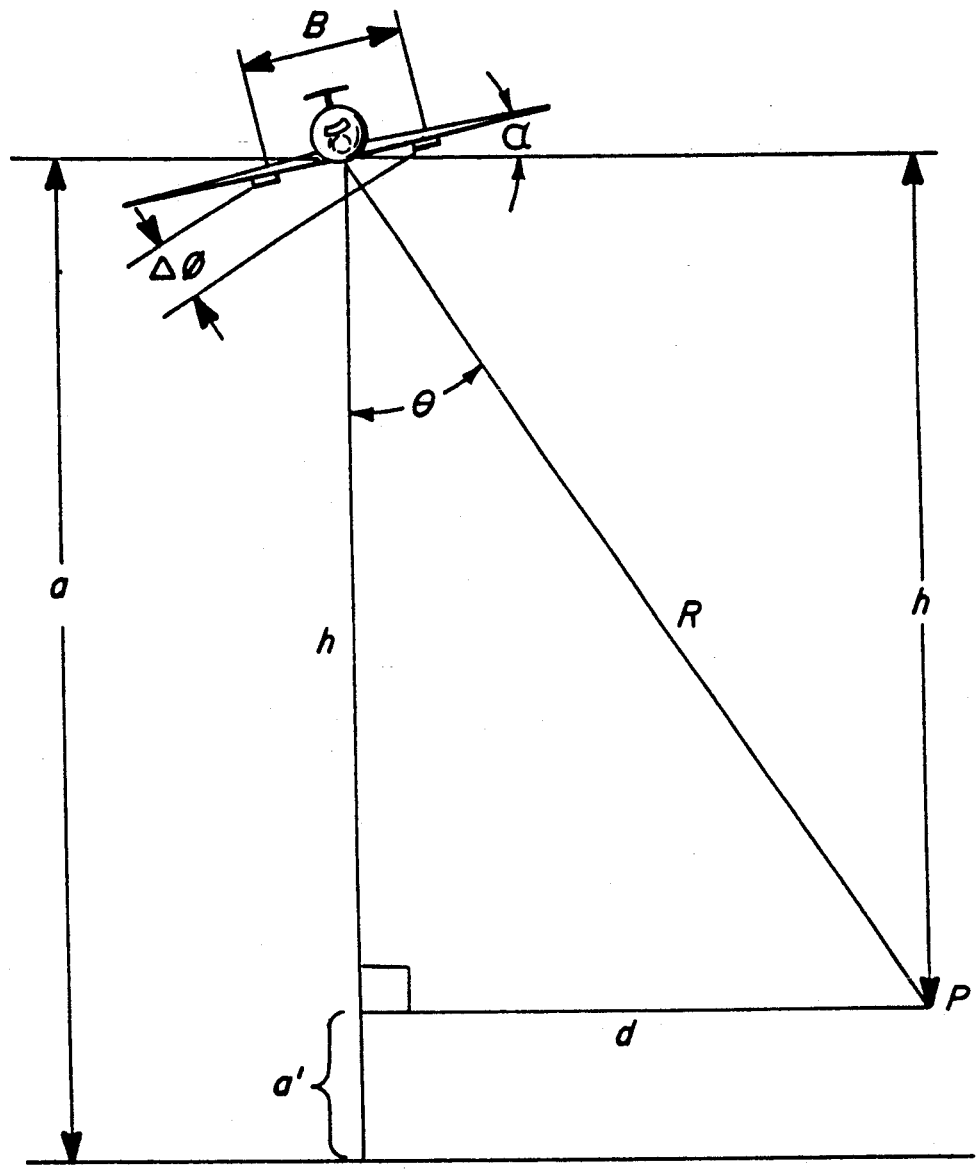
FIG. 2 illustrates the principle of correction for roll angle of the platform.

FIG. 2 illustrates the manner of using the two antennas 21 and 22 to detect slant angle $\theta$ to a particular point P as proposed in Richman. Echo returns to the two antennas 21 and 22 are processed as a plurality of resolution cells divided by slant range R and Doppler frequency. This processing into individual resolution cells permits identification of the respective echo returns at antennas 21 and 22 from the same point P to be located in three dimensions. The difference in slant range $\Delta r$ between two echo returns for the same resolution cell enables determination of the slant angle $\theta$. This slant range difference is given by:

$$\Delta r = B \sin(\theta - \alpha) \quad (1)$$

where: $\Delta r$ is the slant range difference between the echo returns for the two antennas 21 and 22; B is the known distance between antennas 21 and 22; $\theta$ is the slant angle to point P; and $\alpha$ is the roll angle of the interferometer baseline that is primarily due to roll of aircraft 10. A measure of the slant range difference $\Delta r$ can be obtained from the measured phase difference $\Delta \phi_M$ between the echo returns for the two antennas 21 and 22. This phase difference $\Delta \phi_M$ can be measured directly at the radar receivers. Thus:

$$\Delta \phi_M = \frac{2\pi B}{\lambda} \sin(\theta - \alpha) \qquad (2)$$

where: $\lambda$ is the average wavelength of the radar transmissions. Solving for the slant angle $\theta$ we find:

$$\theta = \alpha + \sin^{-1}\left(\frac{\Delta \phi_M \lambda}{2\pi B}\right) \qquad (3)$$

The difference in height h between aircraft 10 and point P is given by:

$$h' = R \cos \theta \qquad (4)$$

where: h' is the difference in height between aircraft 10 and point P; and R is the slant range to point P. The terrain elevation a' of point P is calculated from the known or measured altitude a of aircraft 10 relative to a fixed reference such as sea level as follows:

$$a' = a - h' \qquad (5)$$

Thus the terrain elevation a' is given by:

$$a' = a - R \cos\left\{\alpha + \sin^{-1}\left(\frac{\Delta \phi_M \lambda}{2\pi B}\right)\right\} \qquad (6)$$

Lastly, the ground range d from the track of aircraft 10 to point P is calculated as follows:

$$d = R \sin \theta \qquad (7)$$

This is expanded as follows:

$$d = R \sin\left\{\alpha + \sin^{-1}\left(\frac{\Delta \phi_M \lambda}{2\pi B}\right)\right\} \qquad (8)$$

The calculated terrain elevation a' and ground range d of point P are employed in production of the terrain map.

There is a practical problem with the technique proposed by Richman. The determination of the slant angle $\theta$ and hence the calculated terrain elevation a' and ground range d are dependant upon the measured phase difference $\Delta \phi_M$ between the echo returns for the two antennas 21 and 22. The measured phase difference $\Delta \phi_M$ used in equation (2) has an inherent circular ambiguity of $2\pi$. The total phase difference $\Delta \phi_T$ can be expressed as:

$$\Delta \phi_T = 2\pi(n+x) \qquad (9)$$

where: n is an integer; and x is a fraction, $0 < x < 1$. The measured phase difference $\Delta \phi_M$ equals $2\pi x$, thus producing a $2\pi n$ circular ambiguity in the measure of the total phase difference $\Delta \phi_T$. This circular ambiguity in the phase measure produces an ambiguity in the terrain elevation a' computed according to equation (6) and the ground range d computed according to equation (8).

In a typical terrain mapping application, the terrain viewed during a single flight of aircraft 10 may involve a measured phase difference $\Delta \phi_M$ passing through many multiples of $2\pi$. The number of such phase ambiguities depends on the center wavelength $\lambda$, the interferometric baseline B, the roll angle $\alpha$ and the slant range R to the scene under consideration. A prior art technique called phase unwrapping can be used if the total phase difference $\Delta \phi_T$ is well behaved. Changes in the total phase difference $\Delta \phi_T$ between adjacent range and Doppler cells must be less than $\pi$. If this is the case, then any change in the measured phase difference $\Delta \phi_M$ of greater than $\pi$ is assumed to be the crossing of a $2\pi$ circular ambiguity boundary. Thus a factor of $2\pi$ can be added to or subtracted from the measured phase difference $\Delta \phi_M$. It will generally be clear from context whether this factor is to be added or subtracted.

This phase unwrapping technique often works to reduce the ambiguity inherent in the phase difference measurement. There are some problems with this phase unwrapping technique. This technique requires well behaved terrain such that no adjacent slant range and Doppler cells have more than a $\pi$ change in measured phase difference $\Delta \phi_M$. In the presence of noisy data, such as when the strength of the echo return is low or when terrain is shadowed, this criteria may not be met. This criteria may not be met when viewing the face of a steep hill or cliff. Sometimes the top of a hill may have a smaller slant range than the bottom of the hill. This could easily result in a change in the total phase difference $\Delta \phi_T$ containing an unknown number of circular ambiguity intervals. Because the phase unwrapping technique should yield the same result for any path between two separate range and Doppler cells, small areas of ambiguity will not defeat this technique for all terrain to be mapped. Thus the prior art phase unwrapping technique will generally be successful. Even if successful this technique only yields a new version of the measured phase difference, the unwrapped phase difference $\Delta \phi_{UW}$, as follows:

$$\Delta \phi_{UW} = \Delta \phi_T + \Delta \phi_{bias} \qquad (10)$$

where: $\Delta \phi_{bias}$ is an unknown phase bias. The phase bias $\Delta \phi_{bias}$ cannot be determined unless the phase unwrapping process begins with $\Delta_T = 0$. This can only be achieved when viewing terrain directly beneath the aircraft, a case not typically employed.

A known technique for dealing with circular ambiguity problems such as these involves taking plural measurements with differing circular ambiguity intervals. From equation (2) and the geometry of the radar imaging it is clear that the circular ambiguity interval is dependant upon both the baseline B and the center wavelength $\lambda$. Thus one solution to the circular ambiguity in phase measurement is to take additional measurements with either a differing baseline or a differing center wavelength.

There are many ways of exercising these options. An additional baseline could be implemented by employing another antenna on aircraft 10. This would require at least one additional antenna and corresponding receiver. In the case where the radar data is recorded on board aircraft 10 for later processing, the addition of another receiver channel would require additional recording bandwidth. In the case where the radar data is processed or partially processed aboard aircraft 10, additional on board processing capability is needed. It is feasible to employ one movable antenna to avoid the need for an additional antenna and receiver, and additional data recording or processing capability. Such a movable antenna would be cumbersome to employ on aircraft 10 and would result in a reduction of the rate of data acquisition at the primary baseline. The process of taking measurements at an additional center wavelength implies similar additional radar complexity and additional data recording or data processing capability.

Figure 3A:
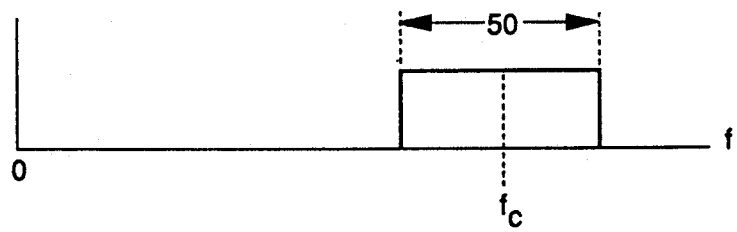
FIGS. 3A, 3B and 3C illustrate the manner of obtaining radar return data of two differing center wavelengths from a single transmission.

This invention is a manner for obtaining data at additional center wavelengths without requiring additional radar hardware or additional data recording capability. This technique proposes additional data processing following data acquisition and recording using the aircraft. This invention exploits the extended bandwidth of wavelengths of these radar transmissions. It is well known in the radar art that the degree of slant range resolution depends upon the transmission bandwidth. A larger transmission bandwidth permits finer slant range resolution. An example synthetic aperture radar terrain system of this invention employs a center frequency $f_C$ of 9.60 GHz. A desired range resolution of about 5 feet requires a transmission bandwidth 50 (see FIG. 3A) of 120 MHz. It is typical to achieve this transmission bandwidth using a linearly swept carrier frequency called an FM chirp transmission. In this example the radar receiver determines the echo return time based upon the instantaneous frequency difference between the echo return and an exemplar of the transmitted signal or a delayed exemplar of the transmitted signal. It is also feasible to determine the range by compressing the received FM chirp signal using a dispersive delay line. This received data is recorded aboard aircraft 10 for later processing.

Figure 3B:
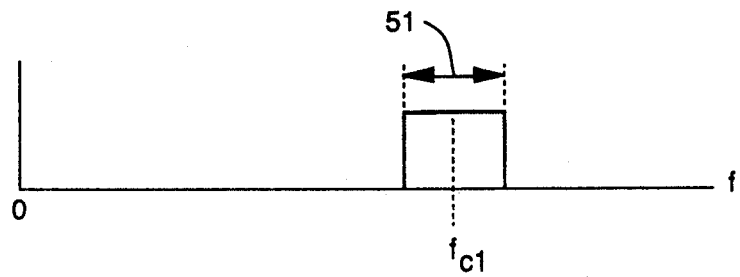
Figure 3C:
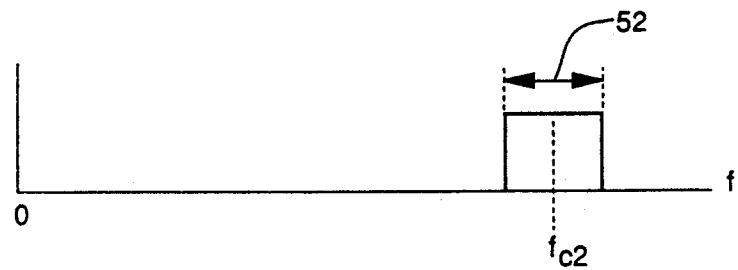

This invention reprocesses the same recorded data to achieve additional center wavelengths. FIG. 3B illustrates the center frequency $f_{C1}$ of a lower subset bandwidth 51 of the original transmitted bandwidth 50. Assuming that lower subset bandwidth 51 is the lower half of the original transmitted bandwidth 50, then lower subset bandwidth 51 is 60 MHz and center frequency $f_{C1}$ is 9.57 GHz. The segregation of lower subset bandwidth 51 from original transmitted bandwidth 50 may take place by processing only the first half or the second half of the FM chirp signal depending on whether the FM chirp signal is increasing or decreasing in frequency. Alternately, some form of filtering may be used. This reduced bandwidth signal is processed in the same manner as the actual transmitted signal in range and Doppler for the two receiving antennas 1 and 22. The corresponding range and Doppler cells of the two processed signals are interfered to determine a measured lower band phase difference $\Delta\phi_{ML}$. FIG. 3C illustrates a similar upper subset bandwidth 52 and center frequency $f_{C2}$. If the upper subset bandwidth 52 is the upper half of the original transmitted bandwidth 50, then upper subset bandwidth 52 is 60 MHz and center frequency $f_{C2}$ is 9.63 GHz. Similar processing of this upper subset bandwidth signal yields a measured upper band phase difference $\Delta\phi_{MU}$. The three phase differences $\Delta\phi_M$, $\Delta\phi_{ML}$ and $\Delta\phi_{MU}$ are based on respective center wavelengths of 3.125 cm, 3.115 cm and 3.135 cm. Thus the $2\pi$ circular ambiguity in each phase measurement may generally be unwrapped even for cases where the phase differences are not well behaved. This is because the $2\pi$ circular ambiguity appears at different places for the three phase measures. Note that the reduced bandwidth of the lower and upper subset bandwidth processing yields coarser slant range resolution, in this case about 10 feet. This fact will be further discussed below.

There is a further practical problem with the technique proposed by Richman. The determination of the slant angle $\theta$ and hence the calculated terrain elevation a' and ground range d are dependant upon the roll angle $\alpha$. Richman does not consider or account for the roll angle $\alpha$. Goldstein et al U.S. Pat. No. 4,551,724, issued Nov. 5, 1985 and entitled "METHOD AND APPARATUS FOR CONTOUR MAPPING USING SYNTHETIC APERTURE RADAR" proposes a solution to this problem. Goldstein et al proposes directly measuring the aircraft roll angle and providing an elevation computation corrected for this measured roll angle. Goldstein et al does not disclose how the roll angle is to be detected but presumably relies on some measurement at the aircraft. The accuracy of the terrain map depends on the accuracy of the roll angle determination. Particularly at long slant ranges, achievable accuracies in direct measurement of the roll angle $\alpha$ result in large errors in the calculated terrain elevation and ground range. There is thus a need for a more accurate determination of the roll angle $\alpha$.

Figure 4:
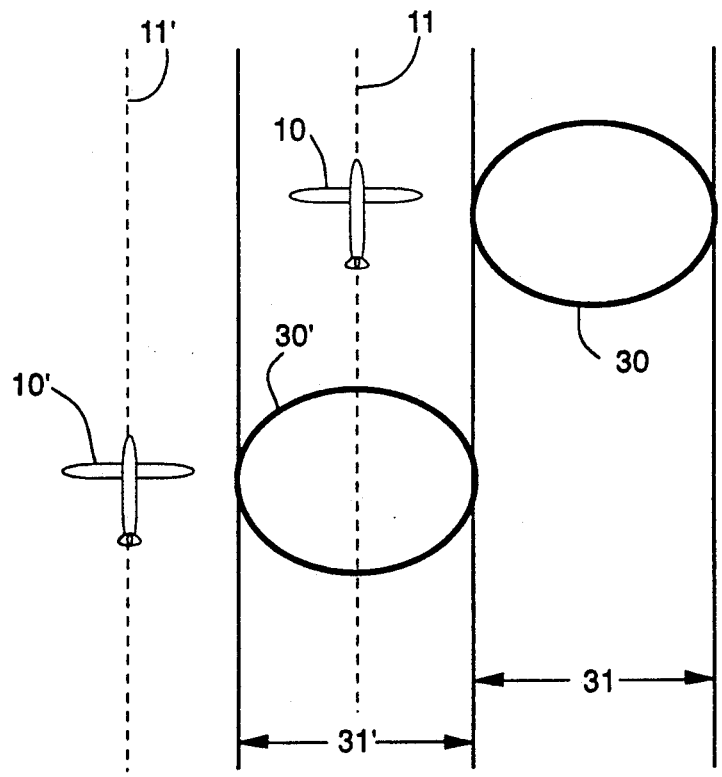
FIG. 4 illustrates the disposition of flight paths in accordance with the present invention.

This invention employs ranging altimeter 23 to provide additional data for a more accurate determination of the roll angle $\alpha$. An overlapping technique, illustrated in FIG. 4, permits accurate determination of the roll angle $\alpha$. Aircraft 10 first flies on track 11. During this flight aircraft 10 operates antennas 21 and 22 to record synthetic aperture radar data. Each transmission covers an area 30 permitting reception of echo returns over this area. During the course of the flight on track 11, the areas 30 overlap to cover a strip of terrain 31. Ranging altimeter 23 provides a substantially continuous measure of the altitude h above ground of aircraft 10 along the flight path 11.

Aircraft 10 then flies on path 11'. Flight path 11' is substantially parallel to flight path 11. The distance from flight path 11 to flight path 11' is selected to provide radar data from a strip 31' that is immediately adjacent to strip 31. It is important that the radar data from strip 31' cover flight path 11 of the prior flight. Aircraft 10 employs antennas 21 and 22 to take radar data of strip 31' during this flight.

This data permits a more accurate determination of the roll angle $\alpha$. It is necessary to identify the synthetic aperture radar data for particular points taken during one flight with the altimeter data for the same points taken during the other flight. Thus the measured phase difference $\Delta\phi_M$ a particular point P from one flight and the measured altitude h' of aircraft 10 above ground at point P from another flight are known. Assuming the altitude of aircraft 10 relative to some unchanging standard, such as sea level, is the same for the two flights, then the roll angle $\alpha$ can be computed. From equation (4) we have:

$$\theta = \cos^{-1}\left(\frac{h'}{R}\right) \quad (11)$$

where R is the known slant range to point P. If the altitudes of the two flights differ, then the measured altitude h' is corrected for this difference in altitude.

Suppose the height during the flight taking the altitude measurements is greater than the height during the flight taking the synthetic aperture radar data by $\Delta h$. Then equation (11) is corrected as:

$$\theta = \cos^{-1}\left(\frac{h' - \Delta h}{R}\right) \quad (12)$$

Substituting the computed value of $\theta$ into equation (3), in the case for equal height flights, and solving for $\alpha$ yields:

$$\alpha = \cos^{-1}\left(\frac{h'}{R}\right) - \sin^{-1}\left(\frac{\Delta \phi_M \lambda}{2\pi B}\right) \quad (13)$$

Thus $\alpha$ can be determined from known quantities ($\lambda$ and B) and measured quantities (h', R and $\Delta \phi_M$). This computed value of $\alpha$ can then be used in the manner taught in Goldstein et al and described above to produce an accurate terrain map for other points in the cross track swath including point P.

There are several aspects to consider in forming the terrain map. It should be understood that it is immaterial whether aircraft 10 first flies along path 11 and makes the altimeter measurement and then flies along path 11' and makes the synthetic aperture radar measurements or makes these measures in the opposite order. In either event all that is necessary is the correlation of altimeter data and synthetic aperture radar data regarding the same point on the ground. Correlation of these two measures need not take place for every possible ground point on each flight path 11. Suitably accurate terrain maps can be formed so long as this correlation and computation of the roll angle $\alpha$ takes place at intervals that are short in relation to the quotient of the time rate of change of the roll angle $\alpha$ divided by the speed of aircraft 10. After correlating the data regarding a first point P and computing the roll angle $\alpha$, the synthetic radar data is corrected for ground height using the computed value of roll angle $\alpha$ for the swath of cross track resolution cells including the point P. This process is repeated for additional points P along the flight path 11. Interpolations of the computed roll angle $\alpha$ are used for points between the swaths of the successive points P. It should be understood that this computation can include corrections for differences in the altitude of aircraft 10 above a fixed reference between the two flights. Note that the altimeter measurement h may be averaged over an area small in relation to the periodicity of terrain elevation changes in order to smooth out noise in this measurement. This implies a time average over a time small relative to the product of the rate of change of terrain elevation with distance and the speed of aircraft 10. Lastly, the beam width angle $\epsilon$ of the altimeter beam 24 must be great enough to insure illumination of nadir point 19 for all expected roll angles $\alpha$.

Figure 5:
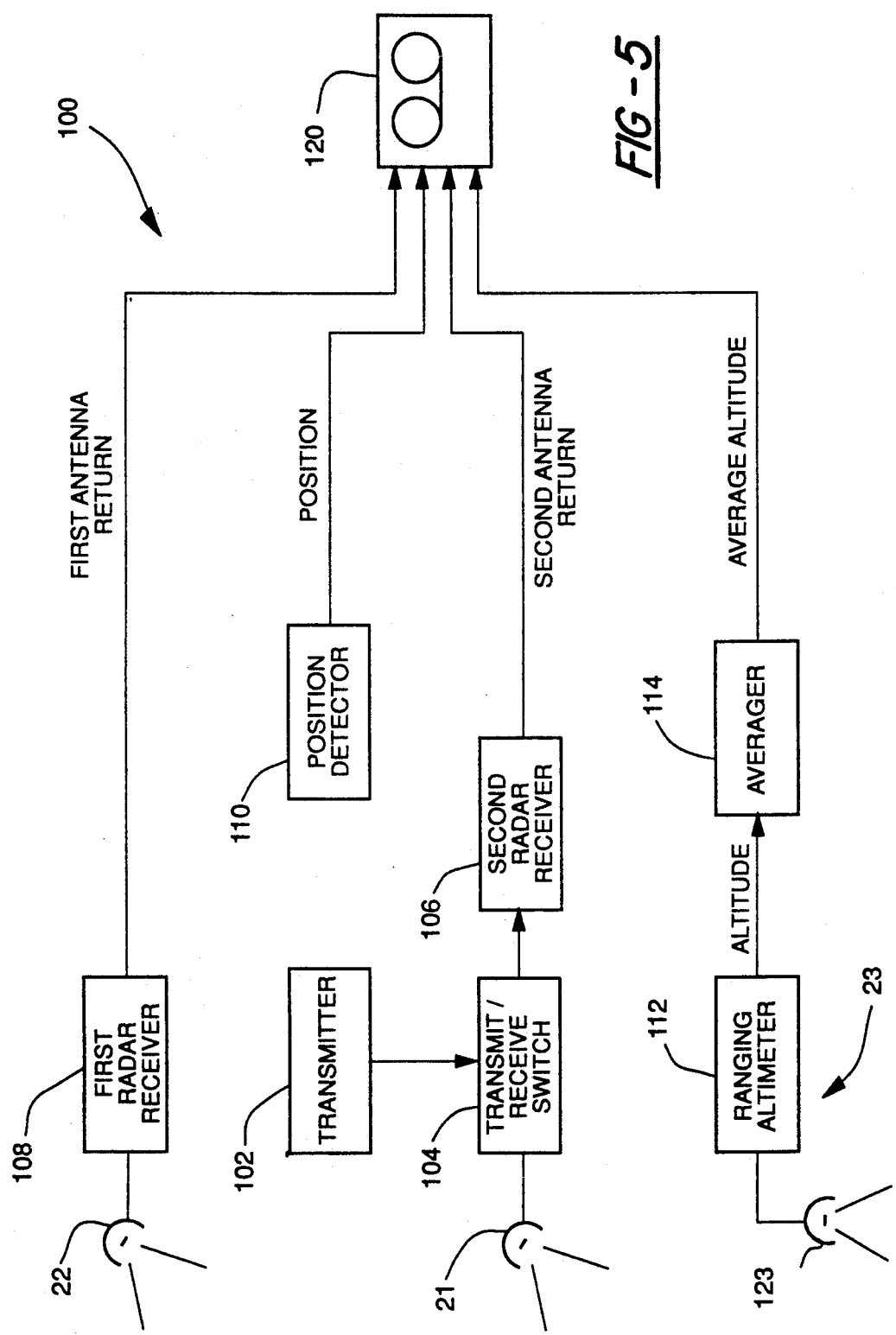
FIG. 5 illustrates in block diagram form an apparatus aboard the moving platform used in practicing the present invention.

FIG. 5 illustrates in block diagram form apparatus 100 disposed on aircraft 10 for practicing this invention. Apparatus 100 includes transmitter 102. Transmitter 102 periodically generates a radar transmission that is coupled to antenna 21 via transmit/receive switch 104. Apparatus 100 includes two radar receivers. Radar receiver 106 receives echo returns from antenna 21 through transmit/receive switch 104. Radar receiver 108 similarly receives echo returns from antenna 22. Position detector 110 is preferably the well known Global Positioning System (GPS) that uses satellite transmissions for position detection. Position detector 110 may also include a ground based radio positioning system and/or an inertial guidance system. Naturally the accuracy of the terrain map formed by this system corresponds to the accuracy of determination of the position of aircraft 10 during the data gathering. An antenna 123 is coupled to the ranging altimeter circuit 112 for the production of altitude data. The altitude data from ranging altimeter 112 is averaged in averager 114. Averager 114 forms a time average over a time that is small compared with the product of the rate of change of terrain elevation with distance along the flight path 11 and the speed of aircraft 10. These data streams are preferably recorded as they are generated and permanently stored on magnetic tape at multichannel recorder 120. Multichannel recorder 120 is capable of recording in time synchronism several channels of data. Multichannel recorder 120 receives the first antenna return from antenna 22, the second antenna return from antenna 21, position data from position detector 110 and average altitude data from averager 114.

Figure 6:
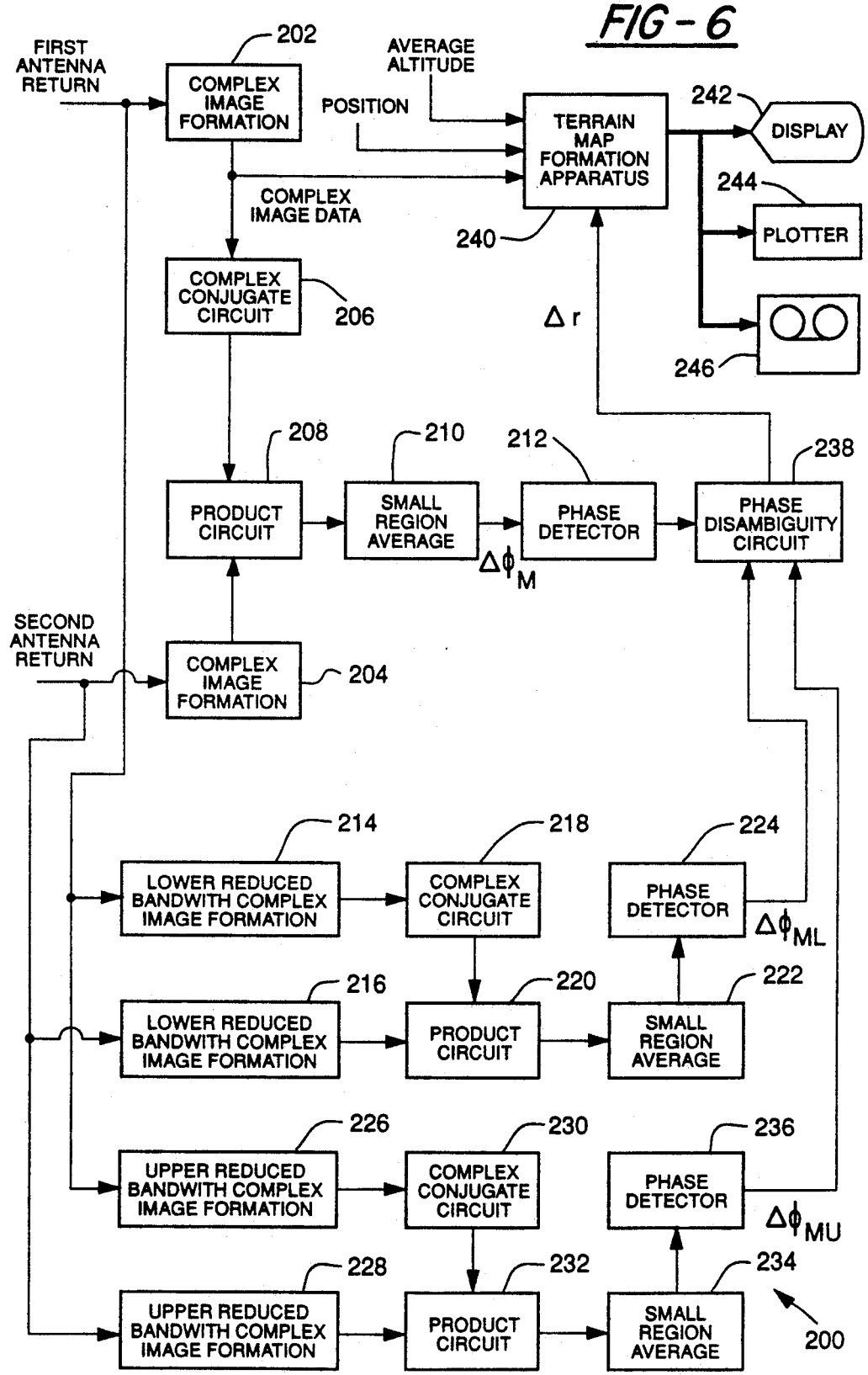
FIG. 6 illustrates in block diagram form an off line apparatus used in practicing the present invention.

FIG. 6 illustrates schematically an off line processing apparatus 200 employed in practicing this invention. Off line processing apparatus 200 receives various signals recorded on a multichannel tape via multichannel tape recorder 120 from a similar tape recorder (not shown). Off line processing apparatus 200 is preferably a ground system not mounted on aircraft 10. Separate recording of the data streams via multichannel recorder 120 and analysis via off line processing apparatus reduces the amount of computing equipment required aboard aircraft 10. This permits the use of a smaller aircraft to achieve the same terrain mapping task. In addition off line processing apparatus 200 need not be constructed to the more stringent standards required for airborne systems.

Off line processing apparatus 200 includes two primary synthetic aperture receivers. Complex image formation processor 202 produces synthetic aperture complex image data for plural resolution cells in slant range and Doppler frequency for the first antenna returns received by antenna 22. Complex image formation processor 204 produces similar synthetic aperture complex image data for plural resolution cells in slant range and Doppler frequency for the second antenna returns received by antenna 21.

The phase difference between the synthetic aperture complex image data for corresponding resolutions cells of the echo returns to antennas 21 and 22 is detected using complex conjugates. If $A\, e^{j\theta}$ is the complex radar amplitude cross section from a particular point P, then:

$$s_a = A\, e^{j\theta}\, e^{j\Delta\phi_M} \quad (14)$$

$$s_b = A\, e^{j\theta} \quad (15)$$

where: $s_a$ is the echo return signal at antenna 21; $s_b$ is the echo return signal at antenna 22. The measured phase difference $\Delta \phi_M$ for each resolution cell is computed from the product S of corresponding resolution cells of the synthetic aperture complex image data for the echo return signal at antenna 21 and the complex conjugate of the synthetic aperture complex image data for the echo return signal at antenna 22. This is given by:

$$S = s_a \times s_b \qquad (16)$$
$$= A e^{j\theta} e^{j\Delta\phi_M} \times A e^{-j\theta}$$
$$= A^2 e^{j\Delta\phi_M}$$

Detecting the phase of the signal S or of the signal $S/A^2$, which has the same phase, determines the measured phase difference $\Delta\phi_M$.

Computation of the measured phase difference $\Delta\phi_M$ is performed by complex conjugate circuit 206, product circuit 208 and phase detector 212. Complex conjugate circuit 206 computes the complex conjugate of the synthetic aperture complex image data for each resolution cell of the echo returns received by antenna 22. Product circuit 208 forms the product of corresponding resolution cells of the synthetic aperture complex image received from antenna 21 with the conjugate of the synthetic aperture complex image data corresponding to the echo returns received from antenna 22. Phase detector 212 detects the phase of the averaged product signal, which represents the phase difference between the two antenna returns. An optional small region average circuit 210 forms an average of the product signals for a small region including the corresponding resolution cell. This circuit will be further described below.

Similar processing occurs for the lower and upper reduced bandwidth signals. Lower reduced bandwidth complex image formation processor 214 produces synthetic aperture complex image data for plural resolution cells in slant range and Doppler frequency for the first antenna returns received by antenna 22 for the lower reduced bandwidth illustrated in FIG. 3b. Lower reduced bandwidth complex image formation processor 214 includes some manner to insure it is responsive to only the lower reduced bandwidth. This could take the form of a band pass filter or of a time filter corresponding to the receipt time of the lower bandwidth of the FM chirp transmission. Lower reduced bandwidth complex image formation processor 216 produces similar synthetic aperture complex image data for plural resolution cells in slant range and Doppler frequency for the lower reduced bandwidth of the second antenna returns received by antenna 21. The lower band phase difference $\Delta\phi_{ML}$ is formed interferometrically in the manner discussed above using complex conjugate circuit 218, product circuit 220 and phase detector 224. This process also preferably includes small region average circuit 222.

Small region average circuit 222 averages the product of the synthetic aperture complex image data of each resolution cell received from antenna 21 with the conjugate of the synthetic aperture complex image data of the corresponding resolution cells received from antenna 22 for the lower reduced bandwidth. Small region average circuit 222 covers a 3 by 3 matrix of resolution cells with the current resolution cell in the center. This circuit is illustrated in FIG. 7.

Figure 7:
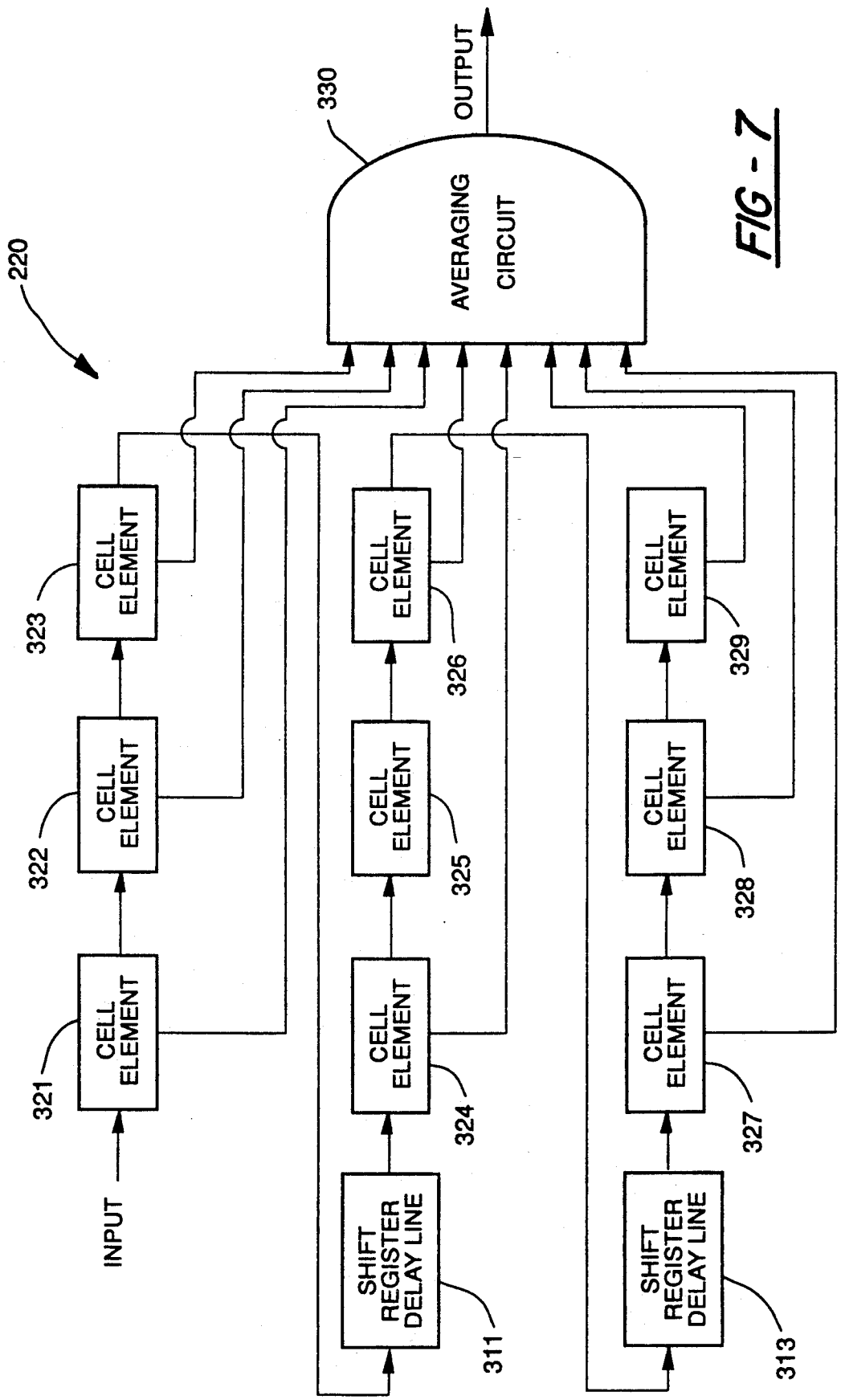
FIG. 7 illustrates in block diagram form the small region average circuit illustrated in FIG. 6.

FIG. 7 illustrates in further detail the construction of an exemplary small region average circuit 210, 222 or 234. The small region average circuit operates in conjunction with a delay line formed of resolution cell elements 321, 322 ... 329, and shift register delay lines 311 and 313. Resolution cell elements 321, 322 ... 329 are each capable of storing the bits corresponding to the product data of a single resolution cell. The number of bits depends on the design choice of slant range and Doppler frequency resolution. The synthetic aperture complex image data formed by complex image formation processors 202 and 204 and by lower reduced bandwidth complex image formation processors 214 and 216 are preferably formed in a matrix of slant range values and Doppler frequency values. This data is read out in a raster scan fashion for supply to the corresponding product circuit 208 or 220. It is immaterial whether the data is organized as rows of slant range resolution cells and columns of Doppler frequency resolution cells or vice verse, so long as both complex images are formed in the same fashion and so long as complex data for the corresponding resolution cells from the two images arrive simultaneously at the corresponding product circuit 208 or 220. Shift register delay lines 311 and 313 have a length equal to three less than the number of resolution cells within each line of the image. Shift register delay lines 311 and 313 must be capable of operating on data words the same size as the complex data of a single resolution cell.

As previously described, resolution cell data is supplied in raster scan fashion to the input of the small region average circuit. The resolution cell data is first stored in resolution cell element 321. Upon receipt of the complex data for the next resolution cell, the data stored in resolution cell element 321 is shifted to resolution cell element 322 and the new data is stored in resolution cell element 321. Receipt of data for the next resolution cell shifts the first data to resolution cell element 323, the second data to resolution cell element 322 with the just received data stored in resolution cell element 321. This process of shifting data along the delay line continues in the direction of the arrows appearing in FIG. 7. Once the data reaches resolution cell element 329, it is discarded upon receipt of data for the next resolution cell. Note that the length of shift register delay lines 311 and 313 has been selected to insure that resolution cell elements 321, 324 and 327 store data corresponding to vertically adjacent resolution cells in the input image. Likewise the data in resolution cell elements 322, 325 and 328 correspond to vertically adjacent resolution cells and the data in resolution cell elements 323, 326 and 329 correspond to vertically adjacent resolution cells.

The small area average circuit operates by presenting appropriate resolution cell data to averaging circuit 330. Note that once the delay line is full, resolution cell elements 321, 322 ... 329 store a 3 by 3 matrix of data from resolution cells that are adjacent in the original image. If resolution cell element 325 represents the center resolution cell, then resolution cell elements 321, 322, 323, 324, 326, 327, 328 and 329 represent the eight immediately adjacent resolution cells. Thus averaging circuit 330 receives data corresponding to a central resolution cell and its neighborhood. Averaging circuit 330 forms the average of the product data of the nine resolution cells. Upon receipt of the data for the next resolution cell, the data shifts so that averaging circuit 330 receives data corresponding to the neighbors of the next resolution cell.

In the simplest case averaging circuit 330 forms the arithmetic mean of the product data of the nine resolution cells. In the alternative, averaging circuit 330 could form a weighted average with the product data in the center resolution cell element 325 weighted more heavily than the peripheral resolution cells.

It is preferable that the phase differences of the resolution cells 321–329 forming the average be corrected to account for differences in slant range. Note that the measured phase difference $\Delta\phi_{ML}$ between the received signal at the two antennas for points on a level plane will change with changes in ground range. This correction preferably assumes that all the resolution cells in the small region are at substantially the same elevation and thus corrects the phase difference for each resolution cell for differences in slant range to a nominal ground plane having the elevation of the resolution cell. The nominal change $\phi$ from the phase difference $\Delta\phi_1$ of a first point and the phase difference $\Delta\phi_2$ of a second point is about:

$$\phi = \frac{2\pi B \, \Delta R \cos\theta \, ctn\, \theta}{\lambda R} \quad (17)$$

where; $\Delta R$ is the change in slant range between the points; the other terms are as previously defined. Note that points in differing Doppler frequency resolution cells having the same slant range need no such correction. The correction is made within averaging circuit 330 by multiplying each product $f_1 \bar{f}_2$ by a phase shift factor $e^{j\phi_i}$ before averaging. The magnitude of the phase shift $\phi_i$ in each phase shift factor $e^{j\phi_i}$ is dependent upon the distance from the nominal center of the small region. This correction prevents the change in the measured lower band phase difference $\Delta\phi_{ML}$ due to change in ground range from overwhelming the change in the measured lower band phase difference $\Delta\phi_{ML}$ due to changes in elevation. This is advantageous because small region average circuit 222 is intended to average or smooth out variations in elevation.

Those skilled in the art would realize that the principles employed in the circuit of FIG. 7 could also be used for larger matrices, and matrices that are not square. Thus the small region of resolution cells used in forming the average could be of another shape and size than this example. Those skilled in the art would also realize that the circuit illustrated in FIG. 7 is merely a convenient manner for computation of the desired average and that other techniques are feasible. In particular, the complex data for each resolution cell could be stored in a memory. When shifting to form the average for the next resolution cell, the complex data for three new resolution cells is recalled from the memory using dedicated memory pointers and the complex data for the three resolution cells no longer needed is discarded.

Small region average circuit 222 operates to smooth out variations in the detected phase difference. The area of small region average circuit 220 must be small in relation to the rate of change of elevation with ground range or along track movement. This prevents a contribution to the average based on terrain elevation change.

Phase detector 224 detects the phase of this average product signal for each resolution cell. The resulting signal corresponds to the phase difference between the echo return of antennas 21 and 22 for the region surrounding the resolution cell of interest for the lower reduced bandwidth.

A similar parallel channel is provided for the upper reduced bandwidth. Upper reduced bandwidth complex image formation processors 226 and 228 operate as previously described except that these receivers are only responsive to the upper reduced bandwidth. The small region average upper band measured phase difference $\Delta\phi_{MU}$ is produced by complex conjugate circuit 230, product circuit 232, small region average circuit 234 and phase detector 236. These circuits are similar to the corresponding circuits described above in the lower reduced bandwidth channel.

Phase disambiguity circuit 238 receives the three phase difference signals $\Delta\phi_M$, $\Delta\phi_{ML}$ and $\Delta\phi_{MU}$. Phase disambiguity circuit 238 matches the three phase difference signals $\Delta\phi_M$, $\Delta\phi_{ML}$ and $\Delta\phi_{MU}$ for the same terrain point P. Because the lower band phase difference $\Delta\phi_{ML}$ and the upper band phase difference $\Delta\phi_{MU}$ have differing circular ambiguity intervals that differ from the circular ambiguity interval of measured phase difference $\Delta\phi_M$, it will almost always be possible to resolve ambiguities in unwrapping the measured phase difference $\Delta\phi_M$. The resultant is an unambiguous indication of the slant range difference $\Delta r$.

It should be understood that it is not necessary to compute the lower band phase difference $\Delta\phi_{ML}$ the upper band phase difference $\Delta\phi_{MU}$ for every terrain point P. It is sufficient to compute the lower band phase difference $\Delta\phi_{ML}$ and the upper band phase difference $\Delta\phi_{MU}$ at intervals that serve as a check on the phase unwrapping of measured phase difference $\Delta\phi_M$. The spacing between these intervals should be selected corresponding to the rate of change of terrain elevation with changes in ground location. The intervals should be more closely spaced for regions where the rate of change of terrain elevation is large and can be more widely spaced in regions where the rate of change of terrain elevation is small.

As previously noted the slant range resolution in the lower and upper reduced bandwidth channels is coarser than that of the main channel. This is believed to present no difficulty in resolving the phase ambiguity. Note that the lower band phase difference $\Delta\phi_{ML}$ and the upper band phase difference $\Delta\phi_{MU}$ are both based on small region averages. It is proposed that these phase differences not be computed at every point in the terrain but rather at intervals related to the terrain elevation variability. These phase difference measures are employed to supplement the finer resolution data produced using the full bandwidth signal in the measure of the slant angle and computation of the terrain elevation. Thus these phase differences need not have the resolution of the main channel. All that is necessary is that the lower band phase difference $\Delta\phi_{ML}$ and the upper band phase difference $\Delta\phi_{MU}$ can be properly correlated with the measured phase difference $\Delta\phi_M$ for the same terrain point.

Off line processing apparatus 200 includes terrain map formation apparatus 240. Terrain map formation apparatus 240 receives the complex image data from complex image formation processor 202, the recorded position data, the recorded average altitude data and the slant range difference $\Delta r$ and forms a terrain map. Terrain map formation apparatus 240 preferably includes a general purpose computer programmed to produce the terrain maps. This process takes place as follows. First, the complex image data and the slant range difference data taken simultaneously are employed together with the aircraft position data to produce a terrain map uncorrected for roll angle $\alpha$. This process employs the disambiguated slant range difference $\Delta r$. The data taken simultaneously can be identified because it appears on corresponding points within the multichannel tape produced by multichannel recorder 120. Next, particular points where altitude data was taken on one flight are identified with the same points in the synthetic aperture radar data. The roll angle $\alpha$ is computed according to equation (13). This computed roll angle $\alpha$ permits correction of the terrain image for roll angle $\alpha$ using equations (6) and (8) for a swath of cross track resolution cells including the particular point. For resolution cells between these swaths of cross track resolution cells, an interpolation of the roll angle $\alpha$ may be used in the terrain image correction. This process of correction for roll angle $\alpha$ is repeated throughout each strip 31 of the synthetic aperture radar data. The resulting terrain map may be translated into a contour map by interpolating from the measured elevations. This contour may be displayed via display 242, plotted via plotter 244 or stored via recorder 246.

The accuracy of the terrain map may be improved by correlating the synthetic aperture radar data with ground survey data. A three dimensional ground survey is made of a few points of terrain easy to identify in the synthetic aperture radar terrain map. These easy to identify points any be any sharp terrain features such as a land/water boundary. A radar corner reflector can be used to ensure a location in the synthetic aperture radar terrain map is easy to identify. The synthetic aperture radar terrain map is then conformed to the ground survey at these few points.

It is technically feasible to do the same computations for production of the corrected terrain map while aloft. All that is required is a computer of sufficient speed and computational capacity to be able to make the terrain map corrections detailed above during flight. Note it is still necessary for some data storage as provided by tape recorder 120. The complex image data and the altitude data corresponding to the same terrain, which must be used in determining the roll angle of the interferometer baseline, are received during different flights of aircraft 10. This requires that data for at least one of these measurements must be stored between flights.

Figure 8:
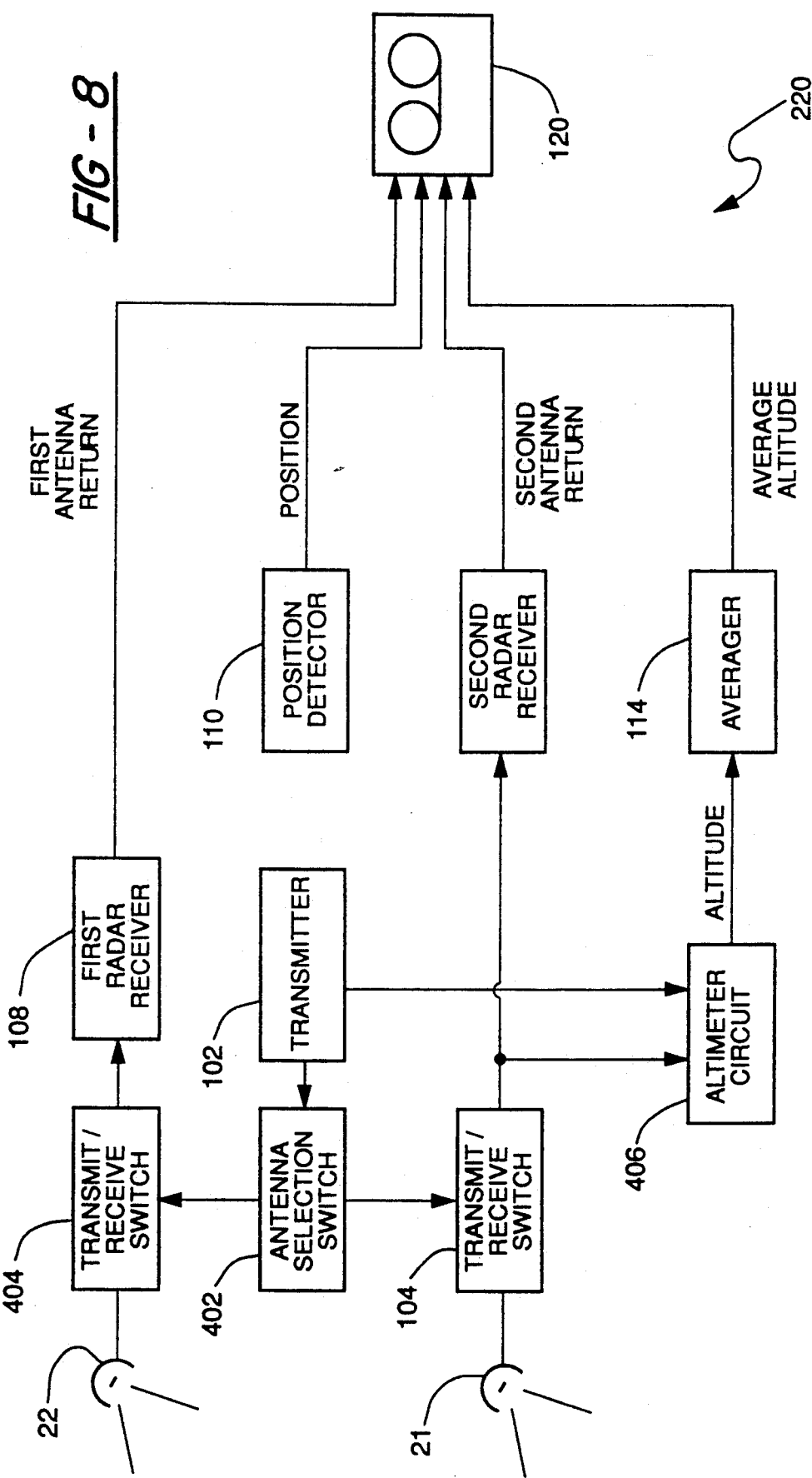
FIG. 8 illustrates in block diagram form an alternative apparatus aboard the moving platform used in practicing this invention.

FIG. 8 illustrates a block diagram of an alternative apparatus 400. Alternative apparatus 400 differs from apparatus 100 in the radar transmissions. Apparatus 400 provides a manner for transmission via both antennas 21 and 22. Transmitter 102 is coupled to antenna selection switch 402. Antenna selection switch 402 supplies the radar transmission from transmitter 102 either to transmit/receive switch 104 or to transmit/receive switch 404. It is preferable to alternate transmission from antenna 21 and 22 by alternating coupling transmitter to transmit/receive switches 104 and 404. The radar receivers 106 and 108 may also be employed alternately. Thus a radar pulse is transmitted by antenna 21 and the echo return received on antenna 21, and next a radar pulse is transmitted by antenna 22 and the echo return received on antenna 22. This technique has the advantage of enhancing the resolution of the measurement. The measured phase difference $\Delta\phi_M$ between the echo returns for the two antennas 21 and 22 is given by:

$$\Delta\phi_M = \frac{2\pi B}{\lambda} \sin(\theta - \alpha) \quad (18)$$

where the quantities are as defined above in conjunction with equation (2). The factor of 2 between the relationships of equation (2) and equation (18) is because of the doubled signal path in the two transmitter case. In the single transmitter case the only path length difference that can contribute to the measured phase difference $\Delta\phi_M$ occurs during the echo return. In the two transmitter case path length differences occur in both the transmission path and in the echo return path. Note that equations (3), (6), (8) and (13) must be modified to include this factor of 2 if transmission are made from both antennas. Thus the interferometer baseline roll angle $\alpha$ is given by:

$$\alpha = \cos^{-1}\left(\frac{h'}{R}\right) - \sin^{-1}\left(\frac{\Delta\phi_M \lambda}{4\pi B}\right) \quad (19)$$

The corrected elevation $a'$ is given by:

$$a' = a - R \cos\left\{\alpha + \sin^{-1}\left(\frac{\Delta\phi_M \lambda}{4\pi B}\right)\right\} \quad (20)$$

Lastly, the ground range d is calculated as follows:

$$d = R \sin\left\{\alpha + \sin^{-1}\left(\frac{\Delta\phi_M \lambda}{4\pi B}\right)\right\} \quad (21)$$

This enhanced resolution permits production of better terrain maps from the same basic equipment or production of equal quality terrain maps from less sophisticated equipment.

It is feasible to employ the echo returns from both antennas 21 and 22 for each transmission regardless of the source antenna. The receiver noise from the two antennas is independent. Thus this additional data, though of a lesser resolution, can be used to reduce the signal to noise ratio in the complex image formation.

The previously described apparatus 100 contemplated a separate ranging altimeter. The required altitude measurement could be made using the synthetic aperture radar transmitter and receiver. The ground immediately below aircraft 10 is much closer to the antennas 21 and 22 than the points within the main response of these antennas. Thus the echo return from the ground immediately below aircraft 10 may be of greater signal strength than the desired echo return, even though the first ground return is from a side lobe of the transmission and is received on a side lobe of the antenna. Typically the receiver in a downwardly looking synthetic aperture radar must be gated off for an interval following each transmission. This prevents the nearby ground return from overloading the receiver. If the receiver gain is merely reduced then this first ground return can serve as the altimeter echo return.

FIG. 8 illustrates altimeter circuit 406. Altimeter circuit 406 receives a signal from transmitter 102 indicating the time of transmission. Altimeter circuit 406 also receives the received echo return signal from transmit/receive switch 104. Altimeter circuit 406 employs these signals to generate an altitude signal in the same manner as previously described in conjunction with ranging altimeter 112. Although altimeter circuit 406 is illustrated as separate from second radar receiver 106, those skilled in the art would realize that these circuits could employ common parts. The essential feature of this alternative embodiment is that the altimeter signal is determined from the primary synthetic aperture radar transmissions without requiring a separate ranging altimeter.

Those skilled in the art would realize that several alternative embodiments for practicing this invention are possible. This invention does not require two reduced bandwidth receiver channels of equal bandwidth whose total bandwidth equals the transmitted bandwidth. Additional data having a differing circular ambiguity interval can be obtained from a single additional channel that employs less than the transmitted bandwidth. Two or more reduced bandwidth receiver channels having differing bandwidths, which may total the transmitted bandwidth, may be used. The essential feature is additional processing of less than the transmitted bandwidth to obtain a differing center wavelength and hence differing circular ambiguity interval than the main channel.

I claim:

1. A method of terrain mapping employing a platform including first and second antennas, the first and second antennas each having a predetermined field of view and together forming an interferometer baseline, said method comprising the steps of:

moving the platform substantially perpendicular to the interferometer baseline along a set of substantially parallel platform paths;

for each such platform path
repeatedly detecting the position of the moving platform,
repeatedly transmitting a radar signal having a predetermined bandwidth via at least one of the first and second antennas,
receiving reflections of each of said transmitted radar signals via the predetermined field of view of at least one of the first and second antennas,
forming first synthetic aperture complex image data for a plurality of resolution cells in slant range and Doppler frequency from radar reflections of said predetermined bandwidth received by the first antenna employing plural transmitted radiant signals;
forming second synthetic aperture complex image data for a plurality of resolution cells in slant range and Doppler frequency from radar reflections of said predetermined bandwidth received by the second antenna employing plural transmitted radiant signals;
determining a first phase difference between said first and second synthetic aperture complex image data for each resolution cell;
forming third synthetic aperture complex image data for a plurality of resolution cells in slant range and Doppler frequency from radar reflections of a first subset of said predetermined bandwidth received by the first antenna employing plural transmitted radiant signals;
forming fourth synthetic aperture complex image data for a plurality of resolution cells in slant range and Doppler frequency from radar reflections of said first subset said predetermined bandwidth received by the second antenna employing plural transmitted radiant signals;
determining a second phase difference between said third and fourth synthetic aperture complex image data for each resolution cell;
resolving circular ambiguities in said first phase difference employing said second phase difference thereby forming a circular ambiguity resolved phase difference; and computing the elevation and ground range for each resolution cell within a selected one of said first and second synthetic aperture complex image data for each of said set of platform paths employing the detected position of the moving platform and said circular ambiguity resolved phase difference between said first and second synthetic aperture complex image data for that platform path.

2. The method of terrain mapping as claimed in claim 1, wherein:
for each platform path
said steps of forming third and fourth synthetic aperture complex image data wherein said first subset of said predetermined bandwidth is one-half of said predetermined bandwidth.

3. The method of terrain mapping as claimed in claim 1, further comprising:
for each platform path
forming fifth synthetic aperture complex image data for a plurality of resolution cells in slant range and Doppler frequency from radar reflections of a second subset of said predetermined bandwidth received by the first antenna employing plural transmitted radiant signals, said second subset of said predetermined bandwidth differing from said first subset of said predetermined bandwidth;
forming sixth synthetic aperture complex image data for a plurality of resolution cells in slant range and Doppler frequency from radar reflections of said second subset said predetermined bandwidth received by the second antenna employing plural transmitted radiant signals;
determining a third phase difference between said fifth and sixth synthetic aperture complex image data for each resolution cell;
said step of resolving circular ambiguities in said first phase difference further employs said third phase difference.

4. The method of terrain mapping as claimed in claim 3, wherein:
said first and second subsets of said predetermined bandwidth are complementary.

5. The method of terrain mapping as claimed in claim 3, wherein:
said first and second subsets of said predetermined bandwidth are differing halves of said predetermined bandwidth.

6. The method of terrain mapping as claimed in claim 5, wherein:
said first subset of said predetermined bandwidth is a lower half of said predetermined bandwidth; and
said second subset of said predetermined bandwidth is an upper half of said predetermined bandwidth.

7. The method of terrain mapping as claimed in claim 1, further comprising:
for each platform path
averaging the phase difference between said third and fourth synthetic aperture complex image data for a small region of resolution cells surrounding each resolution cell, thereby producing a small region averaged second phase difference signal for each resolution cell; and said step of resolving circular ambiguities in said first phase difference employs said small region averaged second phase difference.

8. The method of terrain mapping as claimed in claim 7, wherein:
for each platform path
said step of averaging the phase difference between said third and fourth synthetic aperture complex image data for a small region of resolution cells surrounding each resolution cell includes averaging the phase difference over a three by three matrix of resolution cells centered on said resolution cell.

9. The method of terrain mapping as claimed in claim 7, wherein:
for each platform path
said step of averaging the phase difference between said third and fourth synthetic aperture complex image data for a small region of resolution cells surrounding each resolution cell includes correcting said phase difference for each resolution cell for differences in slant range to a nominal ground plane having the elevation of said resolution cell.

10. The method of terrain mapping as claimed in claim 1, further comprising:
recording said repeatedly detected position of the moving platform, said radar reflections received by the first antenna and said radar reflections received by the second antenna on a multichannel recorder; and
said steps of forming said first, second, third and fourth synthetic aperture complex image data, determining said first and second phase differences, resolving circular ambiguities in said first phase difference and computing the elevation and ground range for each resolution cell within said selected one of said first and second synthetic aperture complex image data occur remotely from the moving platform using said recording.

11. The method of terrain mapping as claimed in claim 1, wherein:
for each platform path
said step of determining the phase difference between said first and second synthetic aperture complex image data for each resolution cell includes
forming the complex conjugate of one of said first and second synthetic aperture complex image data of each resolution cell,
multiplying said complex conjugate of said one of said first and second synthetic aperture complex image data of each resolution cell by the other of said first and second synthetic aperture complex image data of the corresponding resolution cell, thereby forming a product signal for each resolution cell,
determining the phase angle of said product signal for each resolution cell.

12. The method of terrain mapping as claimed in claim 1, wherein:
for each platform path
said step of determining the phase difference between said third and fourth synthetic aperture complex image data for each resolution cell includes
forming the complex conjugate of one of said third and fourth synthetic aperture complex image data of each resolution cell,
multiplying said complex conjugate of said one of said third and fourth synthetic aperture complex image data of each resolution cell by the other of said third and fourth synthetic aperture complex image data of the corresponding resolution cell, thereby forming a product signal for each resolution cell,
determining the phase angle of said product signal for each resolution cell.

13. The method of terrain mapping as claimed in claim 1, further comprising the steps of:
performing a three dimensional ground survey for a plurality of survey points within the terrain imaged;
identifying said resolution cells corresponding to each of said plurality of survey points; and
conforming said corrected elevation and ground range for each resolution cell whereby said corrected elevation and ground range for each resolution cell identified as corresponding to one of said plurality of survey points corresponds to said three dimensional survey of that survey point.

14. The method of terrain mapping as claimed in claim 13, wherein:
said step of identifying said resolution cells corresponding to each of said plurality of survey points includes disposing a radar corner reflector at each of said plurality of survey points.

15. The method of terrain mapping as claimed in claim 1, wherein:
for each platform path
said step of repeatedly transmitting a radar signal via at least one of the first and second antennas consists of repeatedly transmitting a radar signal via the first antenna;
said step of receiving reflections of each of said transmitted radar signals via the predetermined field of view of at least one of the first and second antennas consists of receiving reflections of each of said transmitted radar signals via both the first and second antennas.

16. The method of terrain mapping as claimed in claim 1, wherein:
for each platform path
said step of repeatedly transmitting a radar signal via at least one of the first and second antennas consists of alternately transmitting a radar signal via the first antenna and then via the second antenna;
said step of receiving reflections of each of said transmitted radar signals via the predetermined field of view of at least one of the first and second antennas consists of receiving reflections of each of said transmitted radar signals via the transmitting antenna.

17. The method of terrain mapping as claimed in claim 1, wherein:
for each platform path
said step of repeatedly transmitting a radar signal via at least one of the first and second antennas consists of alternately transmitting a radar signal via the first antenna and then via the second antenna;
said step of receiving reflections of each of said transmitted radar signals via the predetermined field of view of at least one of the first and second antennas consists of receiving reflections of each of said transmitted radar signals via both the first and second antennas.

18. The method of terrain mapping as claimed in claim 1, wherein:
for each platform path
said steps of forming said third and fourth synthetic aperture complex image data, determining said second phase difference and resolving circular ambiguities in said first phase difference are performed only at discrete intervals.

19. The method of terrain mapping as claimed in claim 18, wherein:

for each platform path
said intervals for performing said steps of forming said third and fourth synthetic aperture complex image data, determining said second phase difference and resolving circular ambiguities in said first phase difference are selected in distance inversely proportional to the rate of change of terrain elevation with changes in ground location.

20. A terrain mapping apparatus used with a moving platform having an axis of motion, said apparatus comprising:

a position detector disposed on the moving platform for repeatedly detecting the position of the moving platform;

a first radar antenna disposed on the moving platform having a predetermined field of view off the axis of motion of the moving platform;

a second radar antenna disposed on the moving platform a predetermined distance from said first radar antenna having said predetermined field of view, said first and second radar antennas forming an interferometer baseline substantially perpendicular to the axis of motion;

a transmitter disposed on the moving platform and connected to at least one of said first and second antennas for repeatedly transmitting a radar signal having a predetermined bandwidth via said at least one of said first and second antennas;

a first complex image formation apparatus connected to said first antenna for forming first synthetic aperture complex image data for plural resolution cells in slant range and Doppler frequency from reflections of said predetermined bandwidth received by said first antenna employing plural transmitted radar signals;

a second complex image formation apparatus connected to said second antenna for forming second synthetic aperture complex image data for plural resolution cells in slant range and Doppler frequency from reflections of said predetermined bandwidth received by said second antenna employing plural transmitted radar signals;

a first phase detector connected to said first and second complex image formation apparatuses for determining the phase angle difference between said complex image data of said first and second complex image formation apparatuses for each resolution cell thereby producing a first phase difference signal;

a third complex image formation apparatus connected to said first antenna for forming third synthetic aperture complex image data for plural resolution cells in slant range and Doppler frequency from reflections of a first subset of said predetermined bandwidth received by said first antenna employing plural transmitted radar signals;

a fourth complex image formation apparatus connected to said second antenna for forming second synthetic aperture complex image data for plural resolution cells in slant range and Doppler frequency from reflections of said first subset of said predetermined bandwidth received by said second antenna employing plural transmitted radar signals;

a second phase detector connected to said third and fourth complex image formation apparatuses for determining the phase angle difference between said complex image data of said third and fourth complex image formation apparatuses for each resolution cell thereby producing a second phase difference signal;

a phase disambiguity circuit connected to said first and second phase detectors for resolving circular ambiguities in said first phase difference signal employing said second phase difference signal thereby forming a circular ambiguity resolved phase difference signal; and a terrain map formation means connected to said position detector, said first complex image formation apparatus and said phase disambiguity circuit for computing the elevation and ground range for each resolution cell within said first synthetic aperture complex image data for each of said set of platform paths employing the detected position of the moving platform and said circular ambiguity resolved phase difference signal for each resolution cell.

21. The terrain mapping apparatus as claimed in claim 20, wherein:

said third and forth complex image formation apparatus comprises apparatus for forming image data from reflections of a first bandwidth subset which is one-half of said predetermined bandwidth.

22. The terrain mapping apparatus as claimed in claim 20, further comprising:

a fifth complex image formation apparatus connected to said first antenna for forming fifth synthetic aperture complex image data for plural resolution cells in slant range and Doppler frequency from reflections of a second subset of said predetermined bandwidth received by said first antenna employing plural transmitted radar signals, said second subset of said predetermined bandwidth differing from said first subset of said predetermined bandwidth;

a sixth complex image formation apparatus connected to said second antenna for forming sixth synthetic aperture complex image data for plural resolution cells in slant range and Doppler frequency from reflections of said second subset of said predetermined bandwidth received by said second antenna employing plural transmitted radar signals;

a third phase detector connected to said fifth and sixth complex image formation apparatuses for determining the phase angle difference between said complex image data of said fifth and sixth complex image formation apparatuses for each resolution cell thereby producing a third phase difference signal;

said phase disambiguity circuit being further connected to said third phase detector for resolving circular ambiguities in said first phase difference signal employing said second and third phase difference signals.

23. The terrain mapping apparatus as claimed in claim 22, wherein:

said third and forth complex image formation apparatus comprise apparatus for forming image data from reflections of complementary first and second bandwidth subsets of said predetermined bandwidth.

24. The terrain mapping apparatus as claimed in claim 22, wherein:

said third and forth complex image formation apparatus comprise apparatus for forming image data from reflections of first and second bandwidth subsets which are differing halves of said predetermined bandwidth.

25. The terrain mapping apparatus as claimed in claim 24, wherein:

said third and forth complex image formation apparatus comprises apparatus for forming image data from reflections of a first bandwidth subset which is a lower half of said predetermined bandwidth and from a second bandwidth subset which is an upper half of said predetermined bandwidth.

26. The terrain mapping apparatus as claimed in claim 20, further comprising:

an averager connected to said second phase detector for averaging said second phase difference signal over a small region of resolution cells surrounding each resolution cell, thereby producing a small region averaged second phase difference signal for each resolution cell; and said phase disambiguity circuit is connected to said averager for resolving circular ambiguities in said first phase difference employing said small region averaged second phase difference signal.

27. The terrain mapping apparatus as claimed in claim 20, wherein:

said averager comprises apparatus for averaging said second phase difference signals over a three by three matrix of resolution cells centered on each resolution cell.

28. The terrain mapping apparatus as claimed in claim 20, wherein:

said averager further comprises apparatus for correcting said second phase difference signal for each resolution cell for differences in slant range to a nominal ground plane having the elevation of said resolution cell.

29. The terrain mapping apparatus as claimed in claim 20, further comprising:

a multichannel recorder disposed on the moving platform and connected to said position detector, and said first and second antennas for recording said repeatedly detected position of the moving platform, and said reflections of said predetermined bandwidth received by said first and second antennas;

wherein said first, second, third and fourth complex image formation apparatuses are connected to said multichannel recorder, and said first, second, third and fourth complex image formation apparatuses, said first and second phase detectors, said phase disambiguity circuit and said terrain map formation means are disposed remotely from the moving platform.

30. The terrain mapping apparatus as claimed in claim 20, further comprising:

a transmit/receive switch connected to said first antenna, said transmitter and said first complex image formation apparatus for alternately coupling said transmitter to said first antenna for transmitting a radar pulse and coupling said first complex image formation apparatus to said first antenna for forming first synthetic aperture complex image data from reflections received by said first antenna.

31. The terrain mapping apparatus as claimed in claim 20, further comprising:

an antenna selection switch having an input connected to said transmitter and first and second outputs for alternately connecting said transmitter to said first and second outputs;

a first transmit/receive switch connected to said first antenna, said first complex image formation apparatus and said antenna selection switch for alternately coupling said antenna selection switch to said first antenna for transmitting a radar pulse and coupling said first complex image formation apparatus to said first antenna for forming first synthetic aperture complex image data from reflections received by said first antenna; and a second transmit/receive switch connected to said second antenna, said second complex image formation apparatus and said antenna selection switch for alternately coupling said antenna selection switch to said second antenna for transmitting a radar pulse and coupling said second complex image formation apparatus to said second antenna for forming second synthetic aperture complex image data from reflections received by said second antenna.

32. The terrain mapping apparatus as claimed in claim 20, wherein:

said first phase detector includes a complex conjugate means connected to a selected one of said first and second complex image formation apparatus for forming a complex conjugate signal of said synthetic aperture complex image data of each resolution cell, a product means connected to the other of said selected one of said first and second complex image formation apparatus and said complex conjugate means for multiplying said complex conjugate signal of each resolution cell by said synthetic aperture complex image data of the other of said selected one of said first and second complex image formation apparatus of the corresponding resolution cell, thereby forming a product signal for each resolution cell, and a product phase detector connected to said product means for determining the phase angle of said product signal for each resolution cell.

33. The terrain mapping apparatus as claimed in claim 20, wherein:

said second phase detector includes a complex conjugate means connected to said a selected one of said third and fourth complex image formation apparatus for forming a complex conjugate signal of said synthetic aperture complex image data of each resolution cell, a product means connected to the other of said selected one of said third and fourth complex image formation apparatus and said complex conjugate means for multiplying said complex conjugate signal of each resolution cell by said synthetic aperture complex image data of the other of said selected one of said third and fourth complex image formation apparatus of the corresponding resolution cell, thereby forming a product signal for each resolution cell, and a product phase detector connected to said product means for determining the phase angle of said product signal for each resolution cell.

34. The terrain mapping apparatus as claimed in claim 20, wherein:

said third and fourth synthetic aperture complex image forming apparatuses, said second phase detector and said phase disambiguity circuit comprises apparatus for operating only at discrete intervals.

* * * * *

UNITED STATES PATENT AND TRADEMARK OFFICE
CERTIFICATE OF CORRECTION

PATENT NO. : 5,260,708
DATED : November 9, 1993
INVENTOR(S) : James L. Auterman

It is certified that error appears in the above-indentified patent and that said Letters Patent is hereby corrected as shown below:

Column 11, Line 1, Please delete " $S = s_a \times s_b$ " and insert -- $S = s_a \times \overline{s_b}$ --.

Column 15, Line 55, Please delete " $\frac{2\pi\beta}{\lambda}$ " and insert -- $\frac{4\pi\beta}{\lambda}$ --.

Signed and Sealed this

Third Day of May, 1994

Attest:

BRUCE LEHMAN

*Attesting Officer*     *Commissioner of Patents and Trademarks*